(12) United States Patent
Landis et al.

(10) Patent No.: US 11,153,000 B1
(45) Date of Patent: Oct. 19, 2021

(54) MULTI-FACTOR BEAM SELECTION FOR CHANNEL SHAPING

(71) Applicant: QUALCOMM Incorporated, San Diego, CA (US)

(72) Inventors: Shay Landis, Hod Hasharon (IL); Assaf Touboul, Netanya (IL); Yehonatan Dallal, Kfar Saba (IL); Idan Michael Horn, Hod Hasharon (IL)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/953,232

(22) Filed: Nov. 19, 2020

(51) Int. Cl.
  *H04B 7/06* (2006.01)
  *H04B 7/0426* (2017.01)
  *H04B 7/08* (2006.01)

(52) U.S. Cl.
  CPC .......... *H04B 7/0695* (2013.01); *H04B 7/043* (2013.01); *H04B 7/088* (2013.01)

(58) Field of Classification Search
  CPC ... H04B 7/02; H04B 7/04; H04B 7/08; H04B 7/0695; H04B 7/043; H04B 7/088
  See application file for complete search history.

(56) References Cited

U.S. PATENT DOCUMENTS

| | | | | |
|---|---|---|---|---|
| 5,691,729 A * | 11/1997 | Gutman | ................... | H01Q 3/26 342/151 |
| 6,946,993 B2 * | 9/2005 | Seo | .......................... | H01Q 3/24 342/374 |
| 7,082,174 B1 * | 7/2006 | Smee | ................... | H04B 1/7115 370/206 |
| 7,315,589 B2 * | 1/2008 | Bae | ........................ | H04N 5/455 375/343 |
| 7,330,507 B2 * | 2/2008 | Levasseur | .............. | H04B 7/088 375/232 |
| 7,746,968 B2 * | 6/2010 | Kim | .................. | H04N 21/42638 375/347 |
| 7,809,074 B2 * | 10/2010 | Kotecha | ............ | H04L 25/03343 375/267 |
| 7,995,689 B2 * | 8/2011 | Park | ..................... | H04L 27/2665 375/347 |
| 8,019,016 B1 * | 9/2011 | Lee | .................... | H04L 25/03006 375/299 |
| 8,213,540 B1 * | 7/2012 | Lee | ..................... | H04L 25/0204 375/299 |

(Continued)

*Primary Examiner* — James M Perez
(74) *Attorney, Agent, or Firm* — Holland & Hart LLP

(57) ABSTRACT

Methods, systems, and devices for wireless communications are described. A user equipment (UE) may measure a beam quality metric associated with a reference signal for each candidate beam of a plurality of candidate beams. The UE may determine a set of channel characteristics for each candidate beam of the plurality of candidate beams, where the set of channel characteristics indicates to the UE a level of channel equalization by the UE associated with processing signaling on each candidate beam of the plurality of candidate beams. In some cases, the set of channel characteristics may include a frequency selectiveness of a channel for each candidate beam of the plurality of candidate beams. The UE may select a candidate beam from the plurality of candidate beams based on the beam quality metric and the set of channel characteristics and communicate with a base station using the selected candidate beam.

30 Claims, 11 Drawing Sheets

(56) References Cited

U.S. PATENT DOCUMENTS

| | | | | |
|---|---|---|---|---|
| 8,472,381 B1* | 6/2013 | Lee | H04L 49/101 | 370/328 |
| 8,750,400 B2* | 6/2014 | Ojard | H04B 7/0452 | 375/267 |
| 9,692,494 B2* | 6/2017 | Ryu | H04B 7/0617 | |
| 9,872,296 B2* | 1/2018 | Raghavan | H04B 7/0617 | |
| 10,181,891 B2* | 1/2019 | Islam | H04B 7/0695 | |
| 10,305,537 B2* | 5/2019 | Fan | H04L 25/0224 | |
| 10,356,789 B2* | 7/2019 | Raghavan | H04B 7/0456 | |
| 10,397,888 B2* | 8/2019 | Zhang | H04L 5/005 | |
| 10,404,342 B2* | 9/2019 | Yue | H04B 7/0452 | |
| 10,470,242 B2* | 11/2019 | Zhang | H04B 7/024 | |
| 10,541,741 B2* | 1/2020 | Islam | H04B 7/0617 | |
| 10,616,839 B2* | 4/2020 | Fan | H04L 27/2657 | |
| 10,700,760 B1* | 6/2020 | Berliner | H04B 7/0857 | |
| 10,965,360 B2* | 3/2021 | Schenk | H04B 7/0408 | |
| 10,985,828 B2* | 4/2021 | Islam | H01Q 1/245 | |
| 11,038,742 B2* | 6/2021 | Lincoln | H04J 11/0056 | |
| 2001/0049295 A1* | 12/2001 | Matsuoka | H04B 7/086 | 455/562.1 |
| 2002/0163593 A1* | 11/2002 | Liu | H04L 25/03057 | 348/614 |
| 2004/0061645 A1* | 4/2004 | Seo | H04B 7/088 | 342/383 |
| 2004/0242156 A1* | 12/2004 | Tiirola | H04B 17/20 | 455/25 |
| 2004/0252244 A1* | 12/2004 | Bae | H04N 5/211 | 348/725 |
| 2005/0024540 A1* | 2/2005 | Kim | H04B 7/0851 | 348/614 |
| 2006/0133530 A1* | 6/2006 | Kwak | H04L 27/2647 | 375/267 |
| 2007/0230639 A1* | 10/2007 | Stirling-Gallacher | H04B 7/0408 | 375/347 |
| 2008/0092194 A1* | 4/2008 | Kim | H04N 21/42638 | 725/131 |
| 2008/0205537 A1* | 8/2008 | Kim | H04B 7/086 | 375/267 |
| 2009/0225913 A1* | 9/2009 | Nakahara | H04L 27/2649 | 375/347 |
| 2011/0206150 A1* | 8/2011 | Lakkis | H04L 27/0008 | 375/260 |
| 2012/0099435 A1* | 4/2012 | Barbotin | H04L 1/0631 | 370/241 |
| 2013/0265973 A1* | 10/2013 | Nakamura | H04L 27/2634 | 370/329 |
| 2014/0219449 A1* | 8/2014 | Shattil | H04B 7/0456 | 380/270 |
| 2015/0180561 A1* | 6/2015 | Jindal | H04W 72/0413 | 375/267 |
| 2015/0305047 A1* | 10/2015 | Cheng | H04W 72/085 | 370/248 |
| 2016/0211898 A1* | 7/2016 | Cai | H04L 5/00 | |
| 2017/0272223 A1* | 9/2017 | Kim | H04L 5/0048 | |
| 2017/0337932 A1* | 11/2017 | Iyengar | G10L 21/0208 | |
| 2018/0033447 A1* | 2/2018 | Ramprashad | G10L 21/0216 | |
| 2018/0083680 A1* | 3/2018 | Guo | H04L 5/0048 | |
| 2018/0092129 A1* | 3/2018 | Guo | H04W 56/001 | |
| 2019/0068270 A1* | 2/2019 | Schenk | H04B 7/043 | |
| 2019/0223201 A1* | 7/2019 | Lee | H04L 5/0048 | |
| 2019/0246340 A1* | 8/2019 | Jung | H04W 72/046 | |
| 2020/0228182 A1* | 7/2020 | Nilsson | H04B 7/0695 | |
| 2020/0244509 A1* | 7/2020 | Zhou | H04L 27/3854 | |
| 2020/0358488 A1* | 11/2020 | Cheon | H04B 7/0456 | |
| 2021/0092723 A1* | 3/2021 | Yerramalli | H04B 7/0632 | |
| 2021/0120560 A1* | 4/2021 | Kutz | H04W 24/10 | |

* cited by examiner

MULTI-FACTOR BEAM SELECTION FOR CHANNEL SHAPING

FIELD OF TECHNOLOGY

The following relates to wireless communications, including multi-factor beam selection for channel shaping.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may select a beam pair (e.g., a transmit beam and a receive beam) for communication with a base station. In some cases, the UE may select the beam pair based on a reference signal received power (RSRP) which may cause increased power consumption at the UE.

SUMMARY

The described techniques relate to improved methods, systems, devices, and apparatuses that support multi-factor beam selection for channel shaping. Generally, the described techniques provide for reducing power use and improving data throughput by selecting a beam pair based on a beam quality metric (e.g., a reference signal received power (RSRP)) and one or more channel characteristics (e.g., a frequency selectiveness, a time selectiveness, etc.). For example, a user equipment (UE) may select a beam pair based on both a beam quality metric and a set of channel characteristics.

For example, the UE may measure a beam quality metric associated with a reference signal for each candidate beam of a plurality of candidate beams. The UE may determine a set of channel characteristics for each candidate beam of the plurality of candidate beams, where the set of channel characteristics indicates to the UE a level of channel equalization by the UE associated with processing signaling on each candidate beam of the plurality of candidate beams. In some cases, the set of channel characteristics may include a frequency selectiveness of a channel for each candidate beam of the plurality of candidate beams. The UE may select a candidate beam from the plurality of candidate beams based on the beam quality metric and the set of channel characteristics and communicate with a base station using the selected candidate beam.

A method for wireless communication at a user equipment (UE) is described. The method may include measuring a beam quality metric associated with a reference signal for each candidate beam of a set of multiple candidate beams, determining a set of channel characteristics for each candidate beam of the set of multiple candidate beams, where the set of channel characteristics indicate to the UE a level of channel equalization by the UE associated with processing signaling on each candidate beam of the set of multiple candidate beams, selecting a candidate beam from the set of multiple candidate beams based on the beam quality metric and the set of the channel characteristics, and communicating with a base station using the selected candidate beam.

An apparatus for wireless communication at a UE is described. The apparatus may include a processor, memory in electronic communication with the processor, and instructions stored in the memory. The instructions may be executable by the processor to cause the apparatus to measure a beam quality metric associated with a reference signal for each candidate beam of a set of multiple candidate beams, determine a set of channel characteristics for each candidate beam of the set of multiple candidate beams, where the set of channel characteristics indicate to the UE a level of channel equalization by the UE associated with processing signaling on each candidate beam of the set of multiple candidate beams, select a candidate beam from the set of multiple candidate beams based on the beam quality metric and the set of the channel characteristics, and communicate with a base station using the selected candidate beam.

Another apparatus for wireless communication at a UE is described. The apparatus may include means for measuring a beam quality metric associated with a reference signal for each candidate beam of a set of multiple candidate beams, means for determining a set of channel characteristics for each candidate beam of the set of multiple candidate beams, where the set of channel characteristics indicate to the UE a level of channel equalization by the UE associated with processing signaling on each candidate beam of the set of multiple candidate beams, means for selecting a candidate beam from the set of multiple candidate beams based on the beam quality metric and the set of the channel characteristics, and means for communicating with a base station using the selected candidate beam.

A non-transitory computer-readable medium storing code for wireless communication at a UE is described. The code may include instructions executable by a processor to measure a beam quality metric associated with a reference signal for each candidate beam of a set of multiple candidate beams, determine a set of channel characteristics for each candidate beam of the set of multiple candidate beams, where the set of channel characteristics indicate to the UE a level of channel equalization by the UE associated with processing signaling on each candidate beam of the set of multiple candidate beams, select a candidate beam from the set of multiple candidate beams based on the beam quality metric and the set of the channel characteristics, and communicate with a base station using the selected candidate beam.

In some examples of the method, apparatuses, and non-transitory computer-readable medium described herein, determining the set of channel characteristics may include operations, features, means, or instructions for determining a frequency selectiveness of a channel for each candidate beam of the set of multiple candidate beams, where the frequency selectiveness indicates the level of channel equalization by the UE.

In some examples of the method, apparatuses, and non-transitory computer-readable medium described herein, determining the set of channel characteristics may include operations, features, means, or instructions for determining a time selectiveness of a channel for each candidate beam of the set of multiple candidate beams, where the time selectiveness indicates the level of channel equalization by the UE.

Some examples of the method, apparatuses, and non-transitory computer-readable medium described herein may further include operations, features, means, or instructions for identifying an operating state of the UE, where selecting the candidate beam from the set of multiple candidate beams may be further based on the operating state of the UE.

In some examples of the method, apparatuses, and non-transitory computer-readable medium described herein, the operating state of the UE corresponds to a power state.

Some examples of the method, apparatuses, and non-transitory computer-readable medium described herein may further include operations, features, means, or instructions for determining a weighting for the beam quality metric and a weighting for the set of the channel characteristics, where selecting the candidate beam from the set of multiple candidate beams may be further based on the weighting for the beam quality metric and the weighting for the set of the channel characteristics.

In some examples of the method, apparatuses, and non-transitory computer-readable medium described herein, the beam quality metric corresponds to a reference signal received power.

In some examples of the method, apparatuses, and non-transitory computer-readable medium described herein, the reference signal corresponds to a channel state information reference signal.

In some examples of the method, apparatuses, and non-transitory computer-readable medium described herein, the reference signal corresponds to a synchronization signal block.

DETAILED DESCRIPTION

Figure 1:
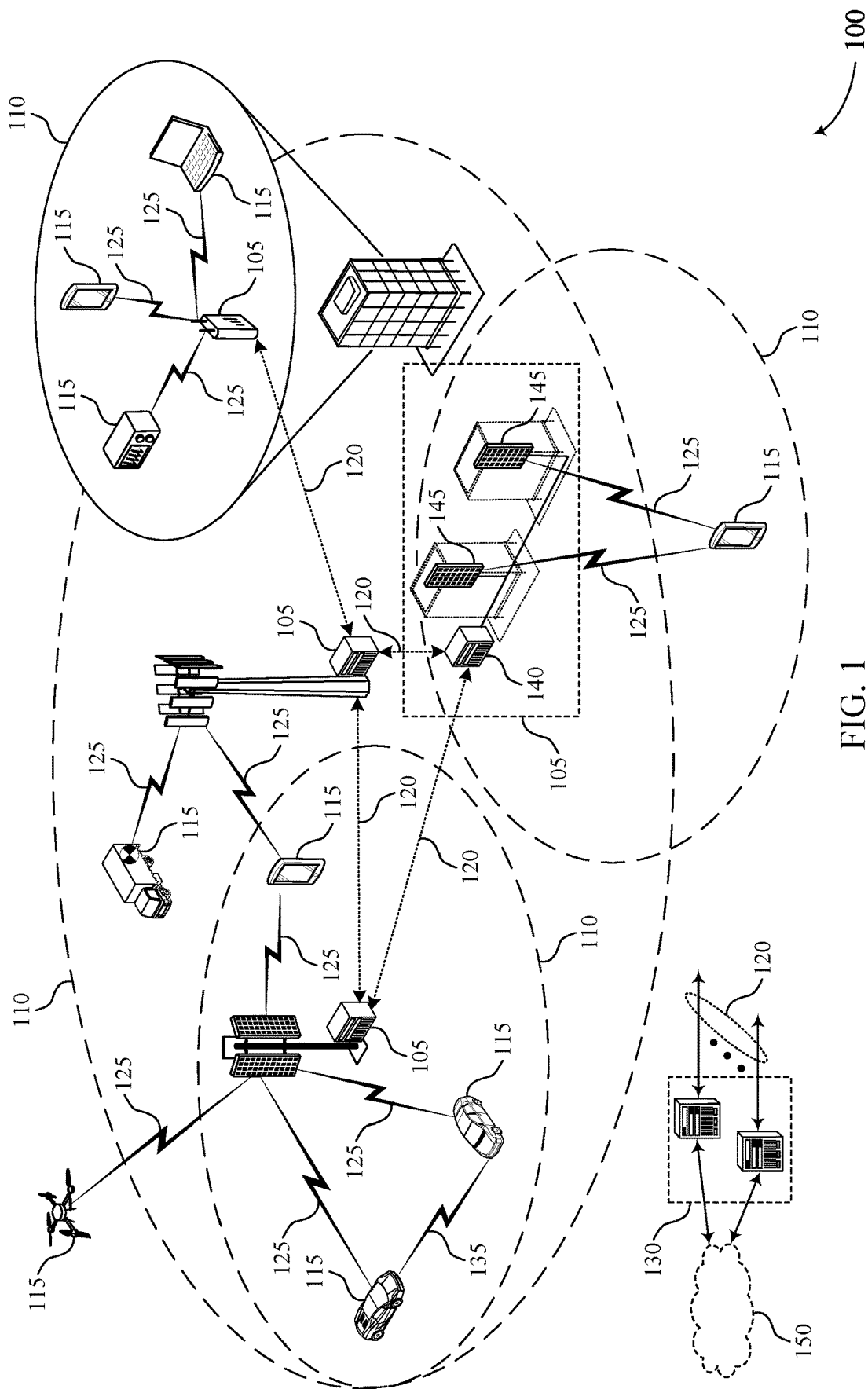
FIG. 1 illustrates an example of a wireless communications system that supports multi-factor beam selection for channel shaping in accordance with aspects of the present disclosure.

In some wireless communications systems, a user equipment (UE) may select a beam pair (e.g., a transmit beam and a receive beam) for communication with a base station. In some cases, the UE may selected the beam pair based on a beam quality metric. For example, the UE may receive a plurality of reference signals (e.g., synchronization signal blocks (SSBs)) corresponding to a plurality of communications channels, determine a reference signal received power (RSRP) for each of the reference signals, and select a beam pair based on the determined RSRPs corresponding to the communication channels. In such systems, the UE may select a beam pair based on the strength of an RSRP corresponding to the beam or communication channel. This selection technique may, however, fail to utilize high performance and/or low power channels, as different channels with the same RSRP may result in different performance and power use.

Various aspects of the present disclosure provide techniques for selecting beams for channel shaping. For example, the UE may select a beam, a beam pair, or a channel based on a channel quality metric (e.g., an RSRP) and one or more channel characteristics (e.g., channel statistics, a channel frequency selectiveness, a channel time selectiveness, a correlation in time and frequency, etc.). The UE may measure a beam quality metric associated with a reference signal for each candidate beam of a plurality of candidate beams and determine a set of channel characteristics for each candidate beam of the plurality of candidate beams. The set of channel characteristics may indicate to the UE a level of channel equalization by the UE associated with processing signaling on each candidate beam of the plurality of candidate beams. In some cases, the channel characteristics may indicate to the UE an amount or processing or power resources associated with decoding signaling on the corresponding channel. The UE may select a candidate beam from the plurality of candidate beams based on the beam quality metric and the set of channel characteristics, and the UE may communicate with the base station using the selected candidate beam.

Such techniques may include determining the set of channel characteristics for each candidate beam of the plurality of candidate beams, and in some cases, the set of channel characteristics may include a channel frequency selectiveness of a channel, and the channel frequency selectiveness may indicate a level of channel equalization by the UE. For example, a channel with high frequency selectiveness may correspond to a high level of channel equalization by the UE, which may correspond to a higher level of processing and power resources by the UE. The UE may select a beam based on the beam quality metric and the set of channel characteristics, which may improve data throughput, reduce UE power use, and enhance UE configuration flexibility. Selecting the beam based on an RSRP as well as one or more channel characteristics may improve overall throughput, while selecting the beam based on one or more channel characteristics (e.g., channel frequency selectiveness and/or channel time selectiveness) may yield simpler channel equalization and reduce power consumption at the UE. In some cases, selecting the beam based on the beam quality metric and the set of channel characteristics may enhance configuration flexibility, as the UE may determine a weight for the beam quality metric and a weight for the set of channel quality characteristics. For example, while operating in a high performance mode, the UE may place a higher weight on the beam quality metric than on the set of channel characteristics, and while operating in a low power mode, the UE may place a higher weight on the set of channel characteristics than the beam quality metric.

Aspects of the disclosure are initially described in the context of wireless communications systems. Aspects of the disclosure are then described in the context of channel frequency selective techniques and a process flow. Aspects of the disclosure are further illustrated by and described with reference to apparatus diagrams, system diagrams, and flowcharts that relate to multi-factor beam selection for channel shaping.

FIG. 1 illustrates an example of a wireless communications system 100 that supports multi-factor beam selection for channel shaping in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some conventional systems, the UE may select an initial beam pair (e.g., UE and base station beams) using a synchronization signal block (SSB). In some examples, the UE may select the initial beam pair based on an RSRP of the SSB, but this may result in poor channel selection as different channels with the same RSRP may correspond to different performances (e.g., although the signal quality may be similar between two channels, the processing power required to decode the two channels may vary significantly). For example, a less frequency selective channel may be associated with smaller channel estimation losses and lower UE power use. As such, the techniques described herein may reduce UE power use and improve battery life. For example, selecting a beam pair based on the frequency selectivity of the channel observed on the SSB on top of the RSRP may decrease power consumption and improve battery life.

The UE 115 may measure a beam quality metric associated with a reference signal for each candidate beam of a plurality of candidate beams. The UE 115 may determine a set of channel characteristics for each candidate beam of the plurality of candidate beams, where the set of channel characteristics indicates to the UE 115 a level of channel equalization by the UE 115 associated with processing signaling on each candidate beam of the plurality of candidate beams. In some cases, the set of channel characteristics may include a frequency selectiveness of a channel for each candidate beam of the plurality of candidate beams. The UE 115 may select a candidate beam from the plurality of candidate beams based on the beam quality metric and the set of channel characteristics and communicate with a base station using the selected candidate beam.

Figure 2:
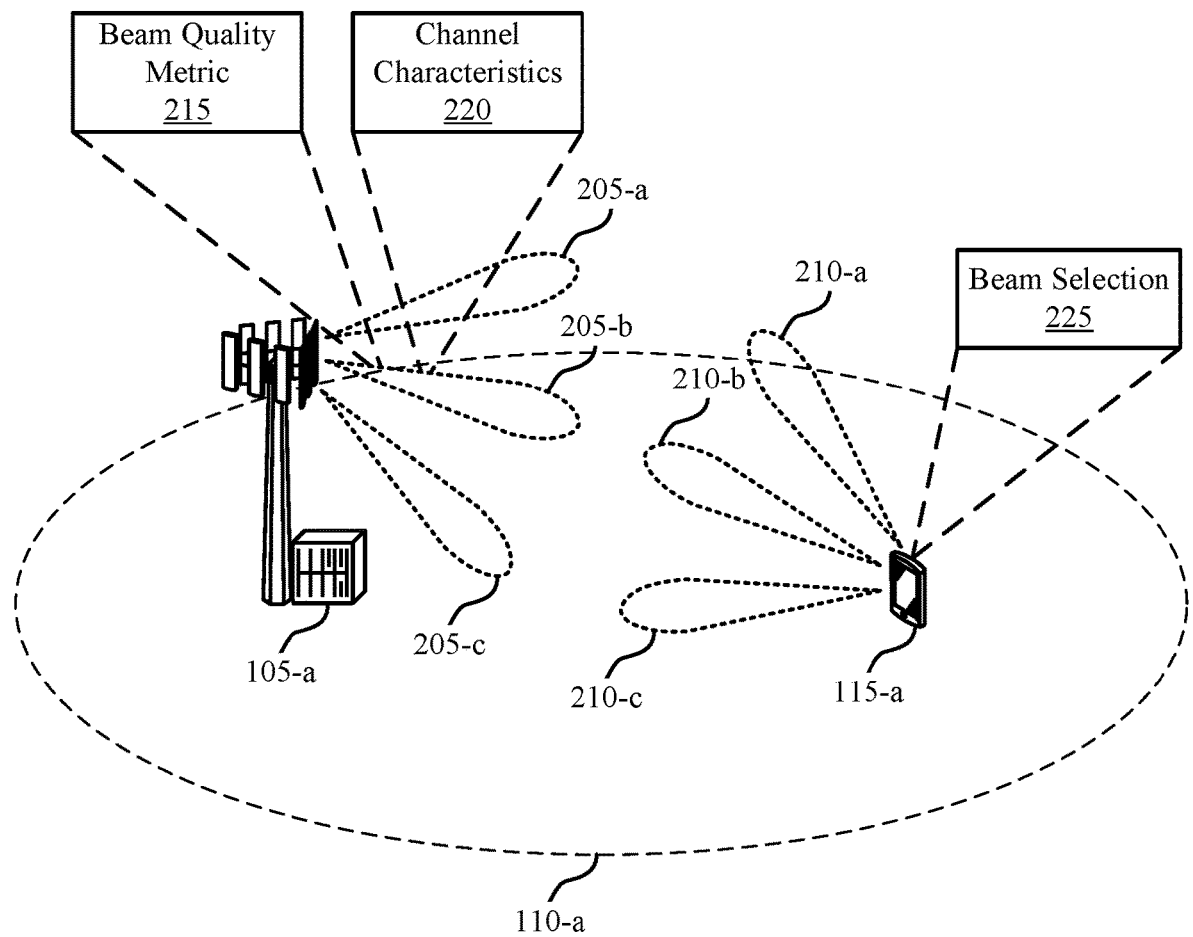
FIG. 2 illustrates an example of a wireless communications system that supports multi-factor beam selection for channel shaping in accordance with aspects of the present disclosure.

FIG. 2 illustrates an example of a wireless communications system 200 that supports multi-factor beam selection for channel shaping in accordance with aspects of the present disclosure. In some examples, wireless communications system 200 may implement aspects of wireless communications system 100. Wireless communications system 200 may include base station 105-a and UE 115-a, which may be examples of the respective devices as described with reference to FIG. 1. Base station 105-a may be associated coverage area 110-a. UE 115-a may communicate with base stations 105-a via one or more receive beams 205 and one or more transmit beams 210, and a receive beam 205, a transmit beam 210, or a receive beam 205 and transmit beam 210 pair may correspond to a communication channel.

UE 115-a may measure a beam quality metric 215 associated with a reference signal for candidate beam 205-a, candidate beam 205-b, and candidate beam 205-c. The reference signal may correspond to an SSB, a CSI-RS, a demodulation reference signal (DMRS), a phase tracking reference signal (PTRS), a sounding reference signal (SRS), or the like. For example, UE 115-a may measure a first SSB received via candidate beam 205-a, a second SSB received via candidate beam 205-b, and a third SSB received via candidate beam 205-c. In some cases, the beam quality metric 215 may correspond to an RSRP of the reference signal. In some cases, the transmits beams 210 may be associated with the receive beams 205. For example, transmit beam 210-a may correspond to receive beam 205-a, transmit beam 210-b may correspond to receive beam 205-b, and transmit beam 210-c may correspond to receive beam 205-c.

UE 115-a may determine a set of channel characteristics 220 for candidate beams 205-a, 205-b, and 205-c. The set of channel characteristics 220 may indicate a level of channel equalization by the UE associated with processing signaling on candidate beam 205-a, 205-b, and 205-c. For example, the set of channel characteristics 220 may include a channel frequency selectiveness, and the channel frequency selectiveness may correlate with or otherwise indicate a level of channel equalization associated with processing signaling on the channel. The channel characteristics 220 may include any type of measurements or features of a channel that indicate to the UE an amount of processing resources (e.g., computational resources, power consumption, computational time, etc.) that would be expended by the UE to receive and decode signaling on that channel. The set of channel characteristics 220 may additionally or alternatively include a time selectiveness of the channel and/or a correlation in frequency and time of the channel, and UE 115-a may use one or more channel characteristics of the set of channel characteristics 220 in selecting a beam pair. In some cases, the beam pair may be selected as part of an initial signal acquisition procedure.

UE 115-a may perform beam selection 225 based on one or more beam quality metrics 215 and one or more sets of channel characteristics 220. In some cases, the number of beam metrics 215 and the number of channel characteristics 220 may be the same as a number of candidate beams. As part of the beam selection 225, UE 115-a may select a beam pair for communicating with base station 105-a. For example, as part of beam selection 225, UE 115-a may select receive beam 205-b and transmit beam 210-b for communicating with base station 105-a. In some cases, the beam pair may be selected based on one or more attribute weights, and the attribute weights may include a beam quality weight, a set of channel characteristics weight, one or more weights corresponding to individual channel characteristics, or any combination thereof. For example, UE 115-a may determine and apply a higher weight (e.g., a weight higher than one or more other weights, a weight higher than a default or standard weight, etc.) to a beam quality metric 225 when performing high throughput or low latency communications. That is, in such cases, the UE 115-a may prioritize candidate beams with higher quality even if processing these beams requires a higher amount of processing resources at the UE. In some cases, the UE 115-a may determine and apply a higher weight to the channel characteristics 220 when operating in a low power state or power conservation state. That is, in such cases, the UE 115-a may prioritizes candidate beams that require less processing resources at the UE even if such beams have a lower signal quality. Determining one or more weights for use in the beam selection 225 may improve configuration flexibility, as UE 115-a may select a beam pair based on a type of communication, a device state, a device location or the like.

The receive beam 205-b and transmit beam 210-b may correspond to a communication channel, and the beam quality metric 215 may indicate a beam quality for the channel (e.g., an RSRP), while the set of channel characteristics 220 may indicate one or more channel characteristics (e.g., a frequency selectiveness, a time selectiveness) for the channel. As part of the beam selection 225, UE 115-a may select a pair of beams for communicating with base station 105-a based on both the beam quality metric and the channel characteristics 220, which may improve data throughput. In some cases, based on the beam selection 225, UE 115-a may select a good channel (e.g., a channel corresponding to less frequency selectiveness than one or more other channels, a channel corresponding to less time selectiveness than one or more other channels, etc.), which may reduce power as the selected channel may be associated with simple (e.g., simpler than one or more other channels) channel equalization.

Figure 3:
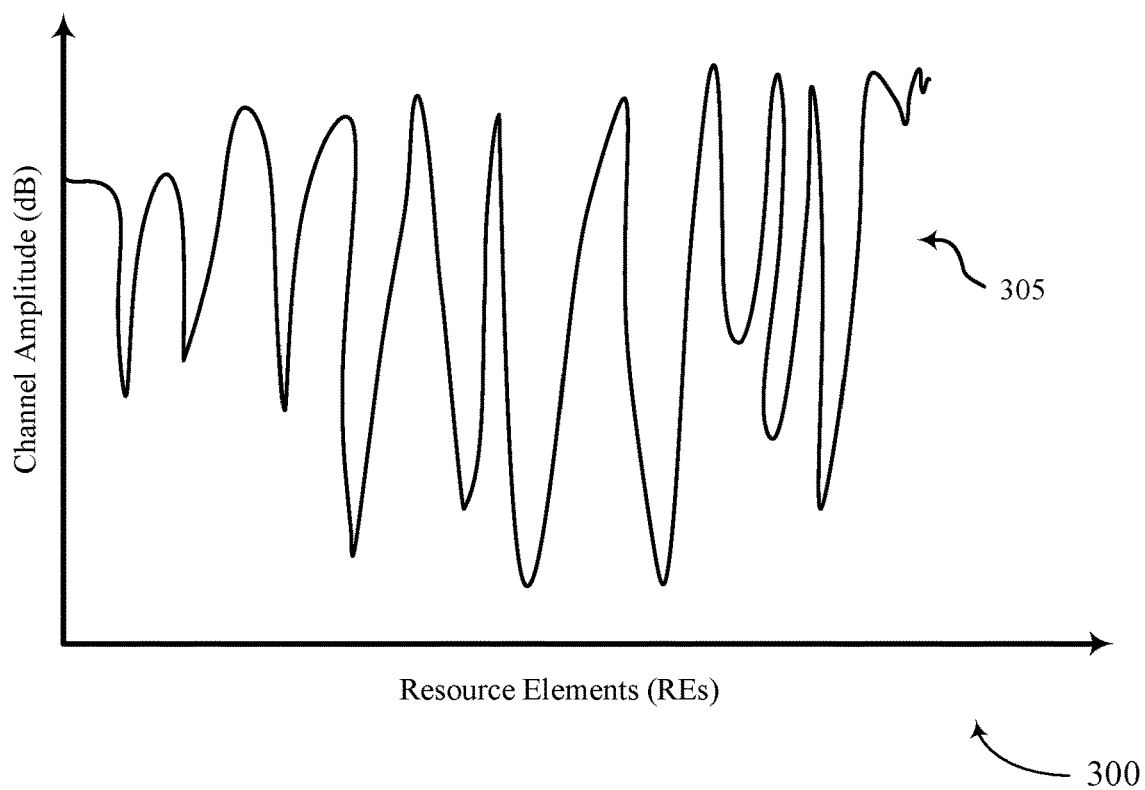
FIG. 3 illustrates an example of a channel frequency selective technique that supports multi-factor beam selection for channel shaping in accordance with aspects of the present disclosure.
Figure 3:
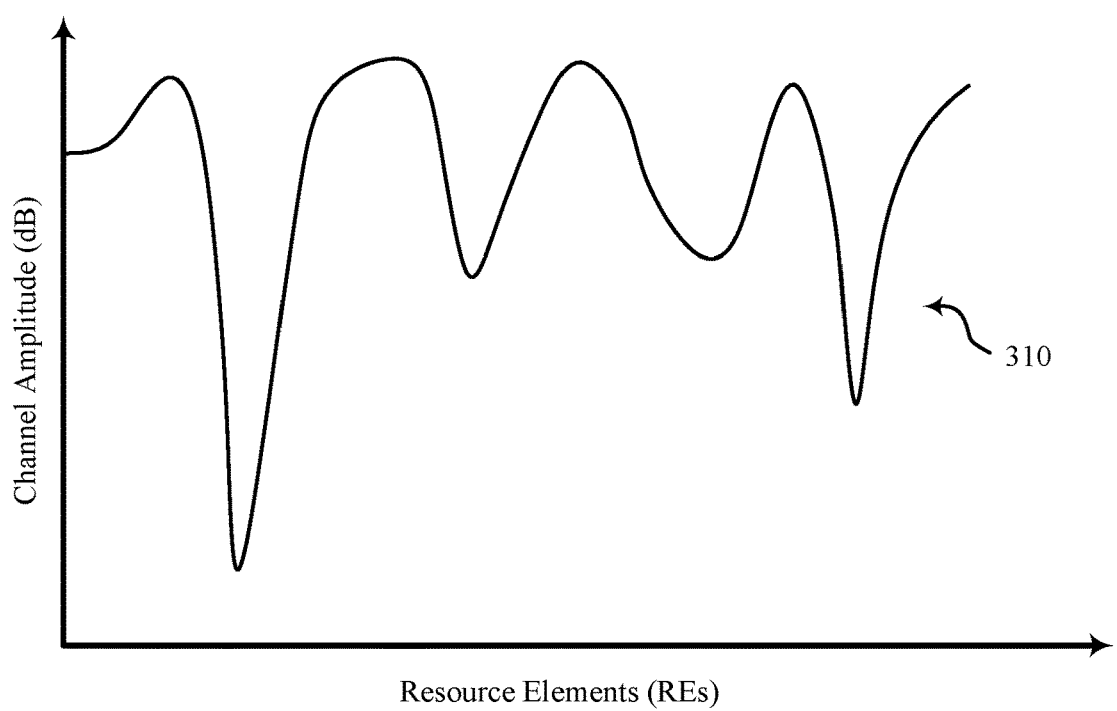

FIG. 3 illustrates an example of a frequency selectiveness corresponding to a first channel 300 and a frequency selectiveness corresponding to a second channel 301 that support multi-factor beam selection for channel shaping in accordance with aspects of the present disclosure. The first channel 300 and the second channel 301 may correspond to the same (or similar) RSRP value but different levels of frequency selectiveness.

The first channel 300 may correspond to a higher level of frequency selectiveness than the second channel 301, and the first channel 300 may also be associated with higher channel estimation error than the second channel 301. For example, as shown by frequent, sporadic, or deep troughs of the plotting 305, the first channel 300 may correspond to a significant level of frequency selectiveness. As shown by the relatively less frequent, sporadic, or deep troughs of the plotting 310, the second channel 301 may correspond to a lower level of frequency selectiveness than the first channel 300 (with may be referred to as a "flatter" channel). Since the first channel 300 and the second channel 301 may correspond to the same (or similar) RSRP values but different channel estimations, a UE operating according to conventional techniques may select one of the two channels for communication based on just the RSRP values, even though the two channels may be associated with different performance characteristics or processing requirements (e.g., channel equalization complexity, data throughput, etc.).

In accordance with the techniques described herein, a UE may select the second channel 301 for communication with a base station based on the second channel 301 being associated with channel characteristics (e.g., frequency selectiveness) that indicate a lower processing load at the UE than the first channel 300. Selecting the second channel 301 may reduce power use and improve battery life of the UE, as the second channel 301 may be associated with simpler channel equalization than the first channel 300. Selecting a channel based on a frequency selectiveness may reduce inter-symbol interference (ISI) in cases where, for example, the channel time dispersity is greater than the cyclic prefix (CP) size.

Figure 4:
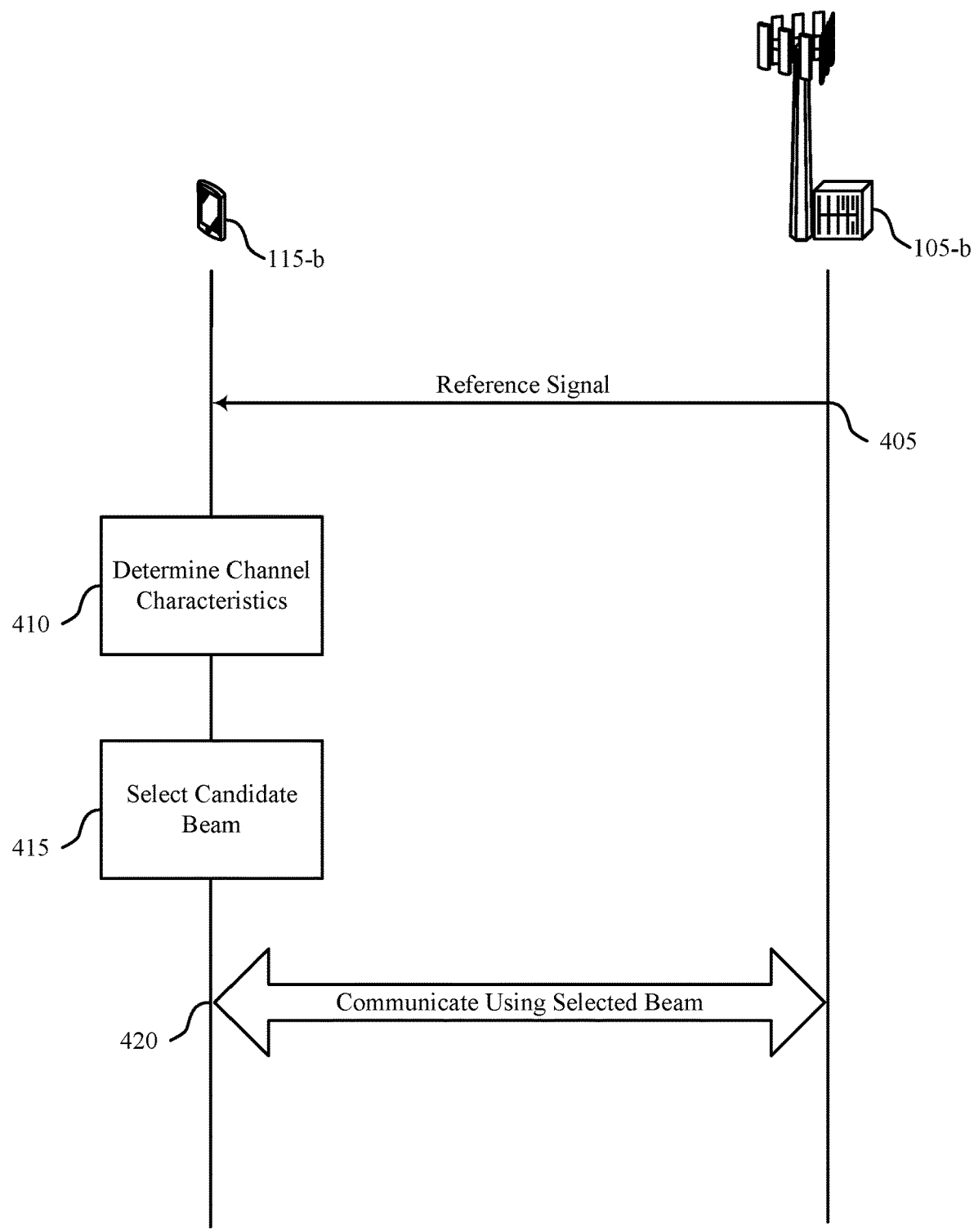
FIG. 4 illustrates an example of a process flow that supports multi-factor beam selection for channel shaping in accordance with aspects of the present disclosure.

FIG. 4 illustrates an example of a process flow 400 that supports multi-factor beam selection for channel shaping in accordance with aspects of the present disclosure. In some examples, the process flow 400 may implement aspects of wireless communications systems 100 or 200. The process flow 400 includes UE 115-b and base station 105-b, which may be examples of the corresponding devices as described with reference to FIG. 1 through FIG. 3. UE 115-b may select a beam pair for communicating with base station 105-b based on a beam quality metric and a set of channel characteristics to improve data throughput, reduce power use, or increase configuration flexibility. Alternative examples of the following may be implemented, where some steps are performed in a different order than described or are not performed at all. In some cases, steps may include additional features not mentioned below, or further steps may be added.

At 405, UE 115-b may receive a reference signal (e.g., an SSB, a demodulation reference signal (DMRS), etc.). UE 115-b may measure a beam quality metric associated with a reference signal for each candidate beam of a plurality of candidate beams. For example, UE 115-b may identify a plurality of candidate beams for communicating with base station 105-b, and UE 115-b may receive a reference signal on each candidate beam and measure a beam quality metric associated with each received reference signal.

At 410, UE 115-b may determine a set of channel characteristics for each candidate beam characteristics for each candidate beam of the plurality of candidate beams. The set of channel characteristics may indicate to UE 115-b a level of channel equalization by UE 115-b associated with processing signaling on each candidate beam of the plurality of candidate beams.

At 415, UE 115-b may select a candidate beam from the plurality of candidate beams based on the beam quality metric and the set of channel characteristics. In some cases, selecting the candidate beam based on the beam quality metric and the set of channel characteristics may enhance configuration flexibility, as the UE may determine a weight for the beam quality metric and a weight for the set of channel quality characteristics when determining which beam to select. For example, while operating in a performance mode, the UE may place a higher weight on the beam quality metric than on the set of channel characteristics, and while operating in a power efficient mode, UE 115-b may place a higher weight on the set of channel characteristics than the beam quality metric. As such, UE 115-b may perform more complex channel equalization while operating in the performance mode to improve data throughput, and UE 115-b may perform simple channel equalization while operating in the power efficient mode to reduce power use and improve battery life.

At 420, UE 115-b may communicate with base station 105-b using the selected candidate beam. For example, UE 115-b may receive data and/or control signaling from base station 105-b on the selected candidate beam. In some cases, UE 115-b may identify a transmit beam based on the selected candidate beam, the beam quality metric, the set of channel characteristics, or any combination thereof, and UE 115-b may transmit signaling to base station 105-b on the transmit beam.

Figure 5:
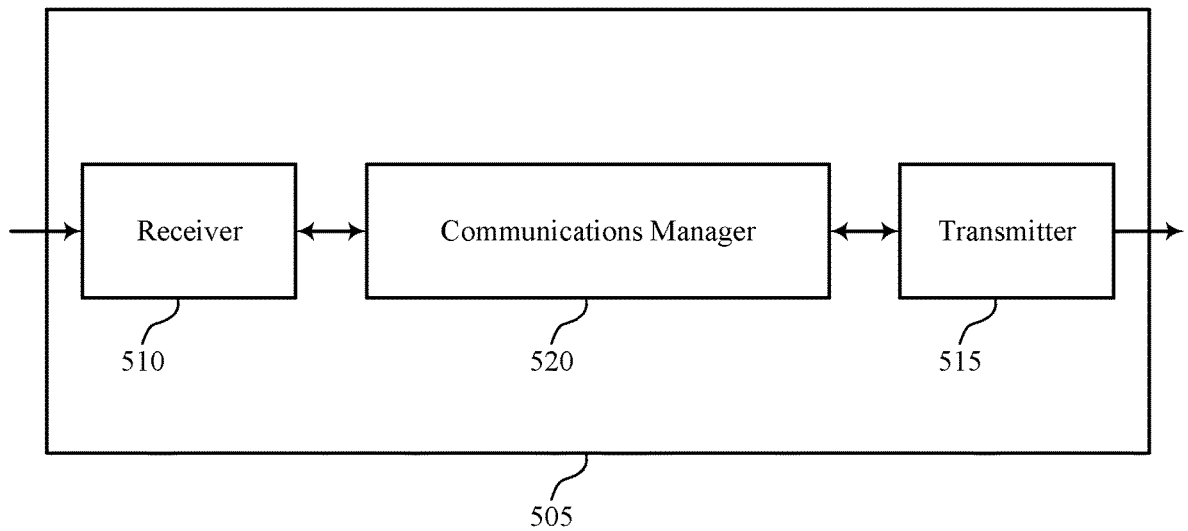
FIGS. 5 and 6 show block diagrams of devices that support multi-factor beam selection for channel shaping in accordance with aspects of the present disclosure.

FIG. 5 shows a block diagram 500 of a device 505 that supports multi-factor beam selection for channel shaping in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to multi-factor beam selection for channel shaping). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to multi-factor beam selection for channel shaping). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of multi-factor beam selection for channel shaping as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for measuring a beam quality metric associated with a reference signal for each candidate beam of a set of multiple candidate beams. The communications manager 520 may be configured as or otherwise support a means for determining a set of channel characteristics for each candidate beam of the set of multiple candidate beams, where the set of channel characteristics indicates to the UE a level of channel equalization by the UE associated with processing signaling on each candidate beam of the set of multiple candidate beams. The communications manager 520 may be configured as or otherwise support a means for selecting a candidate beam from the set of multiple candidate beams based on the beam quality metric and the set of the channel characteristics. The communications manager 520 may be configured as or otherwise support a means for communicating with a base station using the selected candidate beam.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced channel equalization and reduced power consumption. For example, by selecting a channel associated with relatively low frequency selectiveness, the device 505 may perform relatively simple channel equation procedures, and therefore consume less power.

Figure 6:
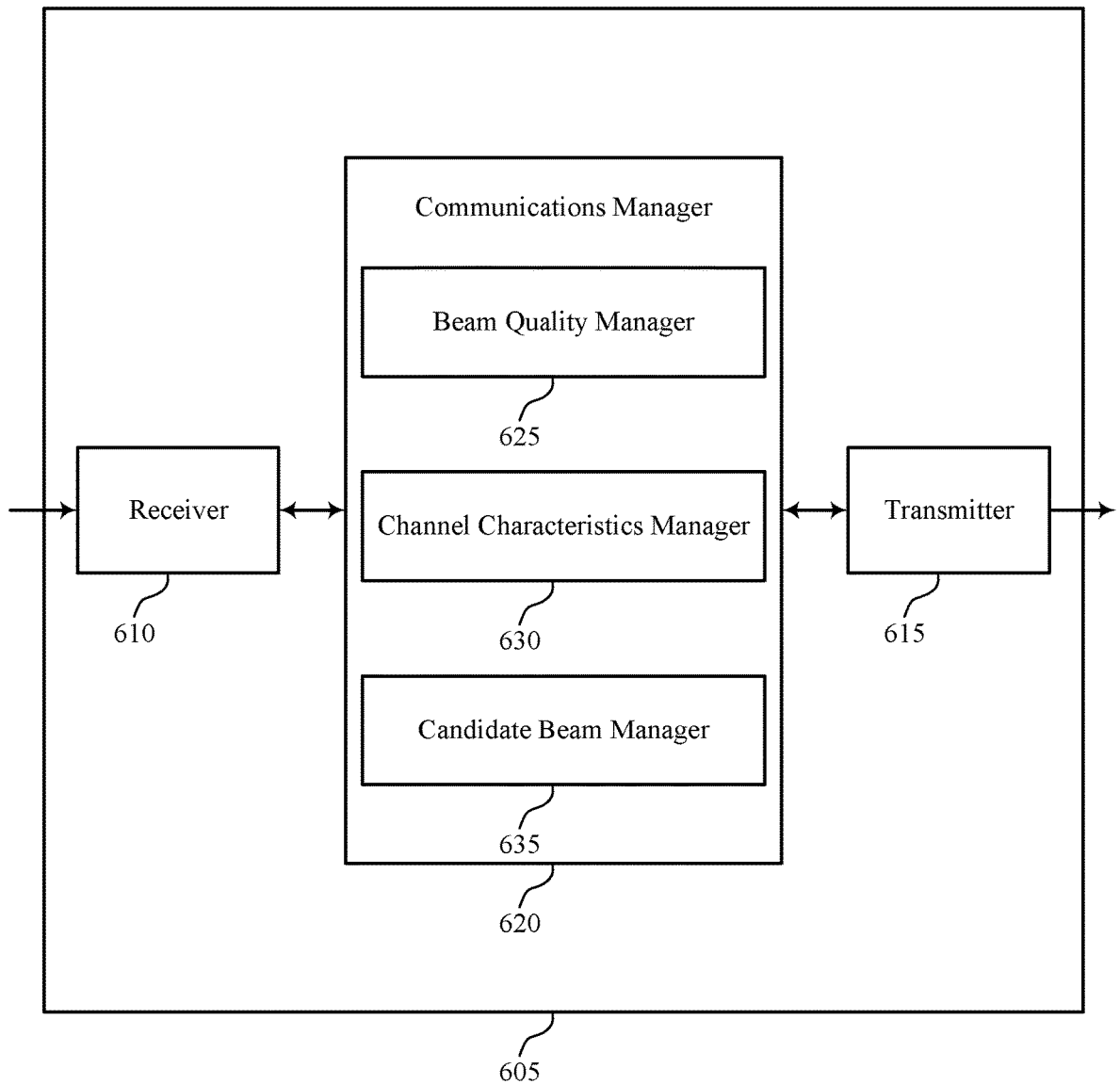

FIG. 6 shows a block diagram 600 of a device 605 that supports multi-factor beam selection for channel shaping in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to multi-factor beam selection for channel shaping). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to multi-factor beam selection for channel shaping). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of multi-factor beam selection for channel shaping as described herein. For example, the communications manager 620 may include a beam quality manager 625, a channel characteristics manager 630, a candidate beam manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The beam quality manager 625 may be configured as or otherwise support a means for measuring a beam quality metric associated with a reference signal for each candidate beam of a set of multiple candidate beams. The channel characteristics manager 630 may be configured as or otherwise support a means for determining a set of channel characteristics for each candidate beam of the set of multiple candidate beams, where the set of channel characteristics indicates to the UE a level of channel equalization by the UE associated with processing signaling on each candidate beam of the set of multiple candidate beams. The candidate beam manager 635 may be configured as or otherwise support a means for selecting a candidate beam from the set of multiple candidate beams based on the beam quality metric and the set of the channel characteristics. The candidate beam manager 635 may be configured as or otherwise support a means for communicate with a base station using the selected candidate beam.

Figure 7:
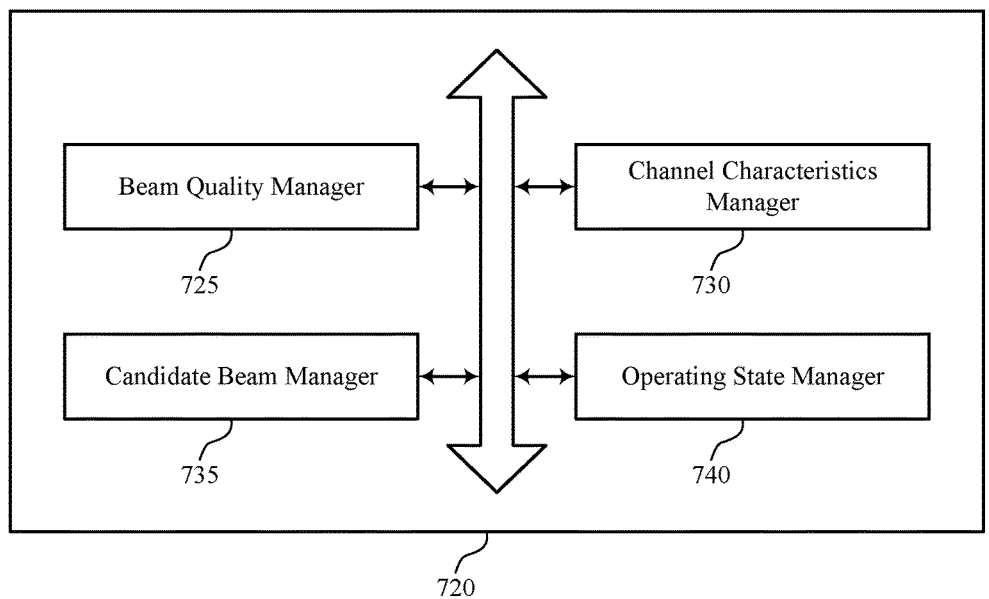
FIG. 7 shows a block diagram of a communications manager that supports multi-factor beam selection for channel shaping in accordance with aspects of the present disclosure.

FIG. 7 shows a block diagram 700 of a communications manager 720 that supports multi-factor beam selection for channel shaping in accordance with aspects of the present disclosure. The communications manager 720 may be an example of aspects of a communications manager 520, a communications manager 620, or both, as described herein. The communications manager 720, or various components thereof, may be an example of means for performing various aspects of multi-factor beam selection for channel shaping as described herein. For example, the communications manager 720 may include a beam quality manager 725, a channel characteristics manager 730, a candidate beam manager 735, an operating state manager 740, or any combination thereof. Each of these components may communicate, directly or indirectly, with one another (e.g., via one or more buses).

The communications manager 720 may support wireless communication at a UE in accordance with examples as disclosed herein. The beam quality manager 725 may be configured as or otherwise support a means for measuring a beam quality metric associated with a reference signal for each candidate beam of a set of multiple candidate beams. The channel characteristics manager 730 may be configured as or otherwise support a means for determining a set of channel characteristics for each candidate beam of the set of multiple candidate beams, where the set of channel characteristics indicates to the UE a level of channel equalization by the UE associated with processing signaling on each candidate beam of the set of multiple candidate beams. The candidate beam manager 735 may be configured as or otherwise support a means for selecting a candidate beam from the set of multiple candidate beams based on the beam quality metric and the set of the channel characteristics. In some examples, the candidate beam manager 735 may be configured as or otherwise support a means for communicate with a base station using the selected candidate beam.

In some examples, to support determining the set of channel characteristics, the channel characteristics manager 730 may be configured as or otherwise support a means for determining a frequency selectiveness of a channel for each candidate beam of the set of multiple candidate beams, where the frequency selectiveness indicates the level of channel equalization by the UE.

In some examples, to support determining the set of channel characteristics, the channel characteristics manager 730 may be configured as or otherwise support a means for determining a time selectiveness of a channel for each candidate beam of the set of multiple candidate beams, where the time selectiveness indicates the level of channel equalization by the UE.

In some examples, the operating state manager 740 may be configured as or otherwise support a means for identifying an operating state of the UE, where selecting the candidate beam from the set of multiple candidate beams is further based on the operating state of the UE. In some examples, the operating state of the UE corresponds to a power state.

In some examples, the candidate beam manager 735 may be configured as or otherwise support a means for determining a weighting for the beam quality metric and a weighting for the set of the channel characteristics, where selecting the candidate beam from the set of multiple candidate beams is further based on the weighting for the beam quality metric and the weighting for the set of the channel characteristics.

In some examples, the beam quality metric corresponds to a reference signal received power. In some examples, the reference signal corresponds to a channel state information reference signal. In some examples, the reference signal corresponds to a synchronization signal block.

Figure 8:
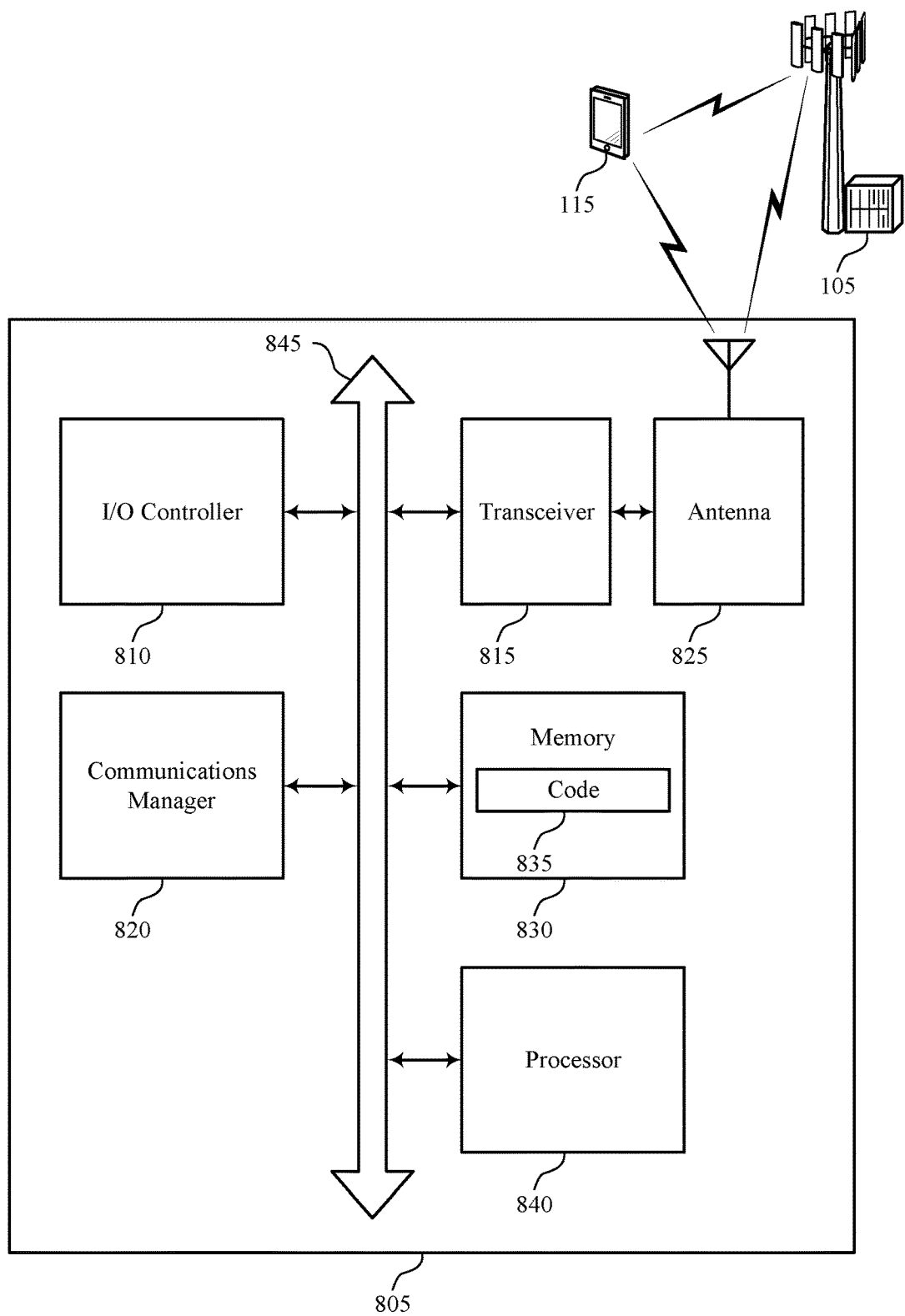
FIG. 8 shows a diagram of a system including a device that supports multi-factor beam selection for channel shaping in accordance with aspects of the present disclosure.

FIG. 8 shows a diagram of a system 800 including a device 805 that supports multi-factor beam selection for channel shaping in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting multi-factor beam selection for channel shaping). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for measuring a beam quality metric associated with a reference signal for each candidate beam of a set of multiple candidate beams. The communications manager 820 may be configured as or otherwise support a means for determining a set of channel characteristics for each candidate beam of the set of multiple candidate beams, where the set of channel characteristics indicates to the UE a level of channel equalization by the UE associated with processing signaling on each candidate beam of the set of multiple candidate beams. The communications manager 820 may be configured as or otherwise support a means for selecting a candidate beam from the set of multiple candidate beams based on the beam quality metric and the set of the channel characteristics. The communications manager 820 may be configured as or otherwise support a means for communicating with a base station using the selected candidate beam.

By including or configuring the communications manager 820 in accordance with examples as described herein, the device 805 may support techniques for reduced power consumption and improved data throughput. For example, by selecting a channel associated with relatively low frequency selectiveness, the device 505 may perform relatively simple channel equation procedures, and therefore consume less power. As another example, by selecting a channel based on a beam quality metric and one or more channel characteristics, the device 505 may improve data throughput, as the one or more channel characteristics may indicate a level of channel performance.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of multi-factor beam selection for channel shaping as described herein, or the processor 840 and the memory 830 may be otherwise configured to perform or support such operations.

Figure 9:
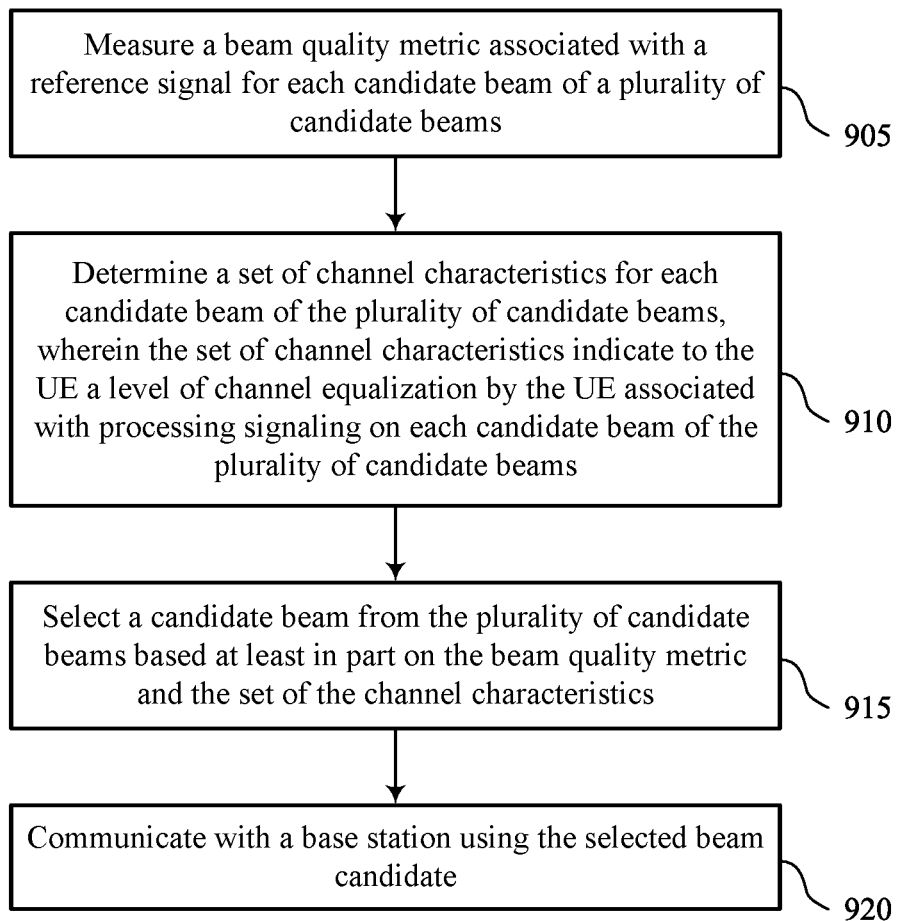
FIGS. 9 through 11 show flowcharts illustrating methods that support multi-factor beam selection for channel shaping in accordance with aspects of the present disclosure.

FIG. 9 shows a flowchart illustrating a method 900 that supports multi-factor beam selection for channel shaping in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include measuring a beam quality metric associated with a reference signal for each candidate beam of a set of multiple candidate beams. The operations of 905 may be performed in accordance with examples as disclosed herein. In some examples, aspects of the operations of 905 may be performed by a beam quality manager 725 as described with reference to FIG. 7.

At 910, the method may include determining a set of channel characteristics for each candidate beam of the set of multiple candidate beams, where the set of channel characteristics indicates to the UE a level of channel equalization by the UE associated with processing signaling on each candidate beam of the set of multiple candidate beams. The operations of 910 may be performed in accordance with examples as disclosed herein. In some examples, aspects of the operations of 910 may be performed by a channel characteristics manager 730 as described with reference to FIG. 7.

At 915, the method may include selecting a candidate beam from the set of multiple candidate beams based on the beam quality metric and the set of the channel characteristics. The operations of 915 may be performed in accordance with examples as disclosed herein. In some examples, aspects of the operations of 915 may be performed by a candidate beam manager 735 as described with reference to FIG. 7.

At 920, the method may include communicate with a base station using the selected candidate beam. The operations of 920 may be performed in accordance with examples as disclosed herein. In some examples, aspects of the operations of 920 may be performed by a candidate beam manager 735 as described with reference to FIG. 7.

Figure 10:
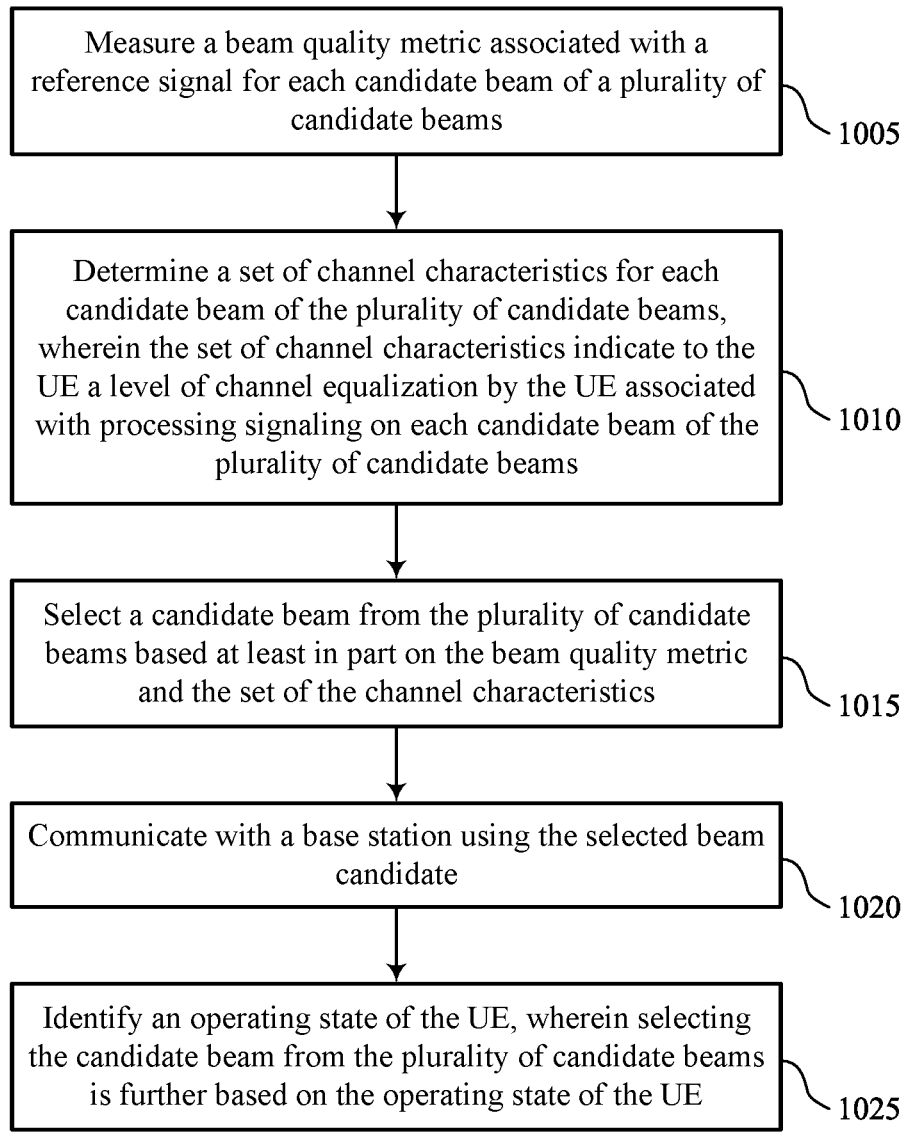

FIG. 10 shows a flowchart illustrating a method 1000 that supports multi-factor beam selection for channel shaping in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include measuring a beam quality metric associated with a reference signal for each candidate beam of a set of multiple candidate beams. The operations of 1005 may be performed in accordance with examples as disclosed herein. In some examples, aspects of the operations of 1005 may be performed by a beam quality manager 725 as described with reference to FIG. 7.

At 1010, the method may include determining a set of channel characteristics for each candidate beam of the set of multiple candidate beams, where the set of channel characteristics indicates to the UE a level of channel equalization by the UE associated with processing signaling on each candidate beam of the set of multiple candidate beams. The operations of 1010 may be performed in accordance with examples as disclosed herein. In some examples, aspects of the operations of 1010 may be performed by a channel characteristics manager 730 as described with reference to FIG. 7.

At 1015, the method may include selecting a candidate beam from the set of multiple candidate beams based on the beam quality metric and the set of the channel characteristics. The operations of 1015 may be performed in accordance with examples as disclosed herein. In some examples, aspects of the operations of 1015 may be performed by a candidate beam manager 735 as described with reference to FIG. 7.

At 1020, the method may include communicate with a base station using the selected candidate beam. The operations of 1020 may be performed in accordance with examples as disclosed herein. In some examples, aspects of the operations of 1020 may be performed by a candidate beam manager 735 as described with reference to FIG. 7.

At 1025, the method may include identifying an operating state of the UE, where selecting the candidate beam from the set of multiple candidate beams is further based on the operating state of the UE. The operations of 1025 may be performed in accordance with examples as disclosed herein. In some examples, aspects of the operations of 1025 may be performed by an operating state manager 740 as described with reference to FIG. 7.

Figure 11:
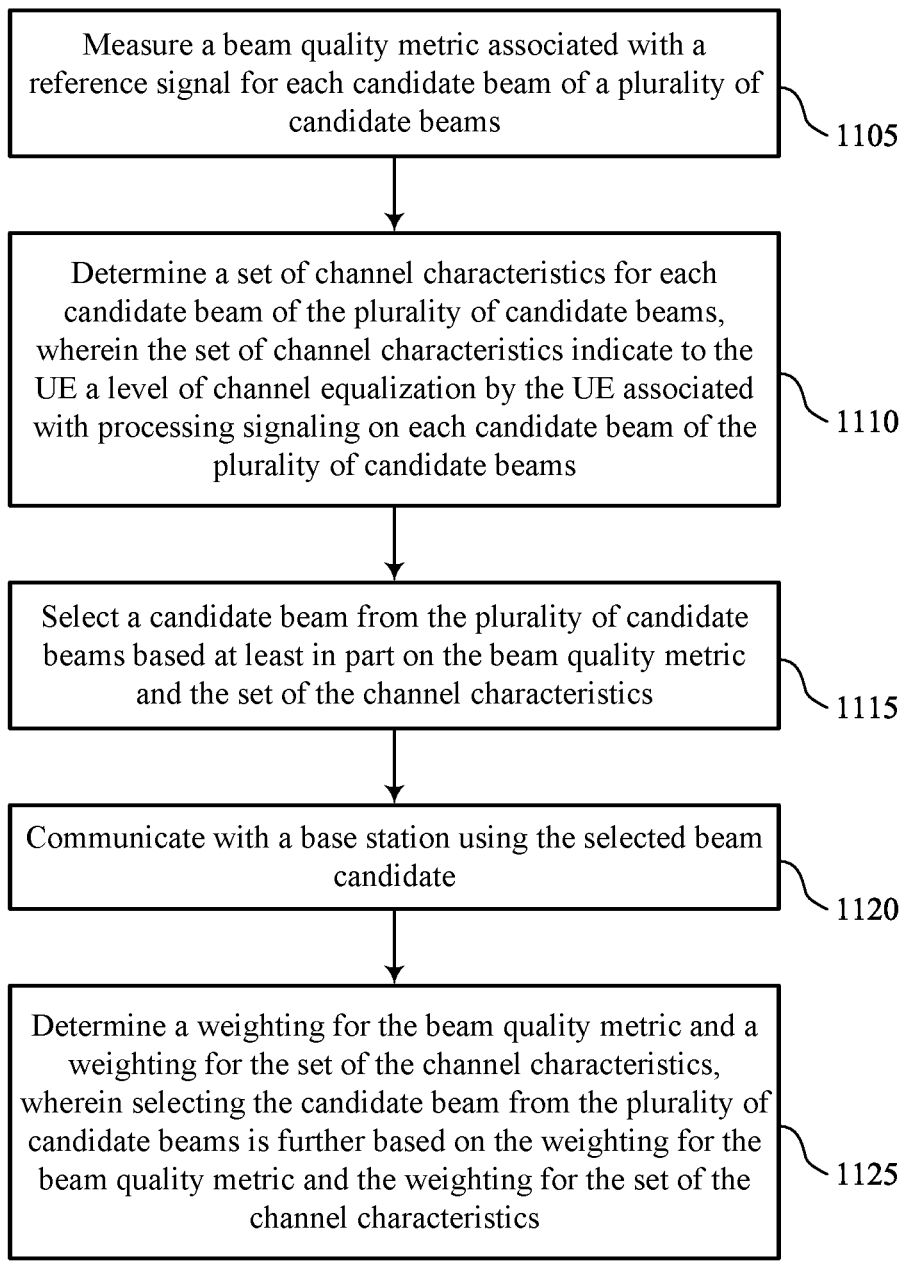

FIG. 11 shows a flowchart illustrating a method 1100 that supports multi-factor beam selection for channel shaping in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include measuring a beam quality metric associated with a reference signal for each candidate beam of a set of multiple candidate beams. The operations of 1105 may be performed in accordance with examples as disclosed herein. In some examples, aspects of the operations of 1105 may be performed by a beam quality manager 725 as described with reference to FIG. 7.

At 1110, the method may include determining a set of channel characteristics for each candidate beam of the set of multiple candidate beams, where the set of channel characteristics indicates to the UE a level of channel equalization by the UE associated with processing signaling on each candidate beam of the set of multiple candidate beams. The operations of 1110 may be performed in accordance with examples as disclosed herein. In some examples, aspects of the operations of 1110 may be performed by a channel characteristics manager 730 as described with reference to FIG. 7.

At 1115, the method may include selecting a candidate beam from the set of multiple candidate beams based on the beam quality metric and the set of the channel characteristics. The operations of 1115 may be performed in accordance with examples as disclosed herein. In some examples, aspects of the operations of 1115 may be performed by a candidate beam manager 735 as described with reference to FIG. 7.

At 1120, the method may include communicate with a base station using the selected candidate beam. The operations of 1120 may be performed in accordance with examples as disclosed herein. In some examples, aspects of the operations of 1120 may be performed by a candidate beam manager 735 as described with reference to FIG. 7.

At 1125, the method may include determining a weighting for the beam quality metric and a weighting for the set of the channel characteristics, where selecting the candidate beam from the set of multiple candidate beams is further based on the weighting for the beam quality metric and the weighting for the set of the channel characteristics. The operations of 1125 may be performed in accordance with examples as disclosed herein. In some examples, aspects of the operations of 1125 may be performed by a candidate beam manager 735 as described with reference to FIG. 7.

The following provides an overview of aspects of the present disclosure:

Aspect 1: A method for wireless communication at a UE, comprising: measuring a beam quality metric associated with a reference signal for each candidate beam of a plurality of candidate beams; determining a set of channel characteristics for each candidate beam of the plurality of candidate beams, wherein the set of channel characteristics indicate to the UE a level of channel equalization by the UE associated with processing signaling on each candidate beam of the plurality of candidate beams; selecting a candidate beam from the plurality of candidate beams based at least in part on the beam quality metric and the set of the channel characteristics; and communicating with a base station using the selected candidate beam.

Aspect 2: The method of aspect 1, wherein determining the set of channel characteristics further comprises: determining a frequency selectiveness of a channel for each candidate beam of the plurality of candidate beams, wherein the frequency selectiveness indicates the level of channel equalization by the UE.

Aspect 3: The method of any of aspects 1 through 2, wherein determining the set of channel characteristics further comprises: determining a time selectiveness of a channel for each candidate beam of the plurality of candidate beams, wherein the time selectiveness indicates the level of channel equalization by the UE.

Aspect 4: The method of any of aspects 1 through 3, further comprising: identifying an operating state of the UE, wherein selecting the candidate beam from the plurality of candidate beams is further based on the operating state of the UE.

Aspect 5: The method of aspect 4, wherein the operating state of the UE corresponds to a power state.

Aspect 6: The method of any of aspects 1 through 5, further comprising: determining a weighting for the beam quality metric and a weighting for the set of the channel characteristics, wherein selecting the candidate beam from the plurality of candidate beams is further based on the weighting for the beam quality metric and the weighting for the set of the channel characteristics.

Aspect 7: The method of any of aspects 1 through 6, wherein the beam quality metric corresponds to a reference signal received power.

Aspect 8: The method of any of aspects 1 through 7, wherein the reference signal corresponds to a channel state information reference signal.

Aspect 9: The method of any of aspects 1 through 8, wherein the reference signal corresponds to a synchronization signal block.

Aspect 10: An apparatus for wireless communication at a UE, comprising a processor; memory coupled with the processor; and instructions stored in the memory and executable by the processor to cause the apparatus to perform a method of any of aspects 1 through 9.

Aspect 11: An apparatus for wireless communication at a UE, comprising at least one means for performing a method of any of aspects 1 through 9.

Aspect 12: A non-transitory computer-readable medium storing code for wireless communication at a UE, the code comprising instructions executable by a processor to perform a method of any of aspects 1 through 9.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   measuring a beam quality metric associated with a reference signal for each candidate beam of a plurality of candidate beams;
   determining a set of channel characteristics for each candidate beam of the plurality of candidate beams, wherein the set of channel characteristics indicates to the UE a level of channel equalization by the UE associated with processing signaling on each candidate beam of the plurality of candidate beams;
selecting a candidate beam from the plurality of candidate beams based at least in part on the beam quality metric and the set of the channel characteristics; and
communicating with a base station using the selected candidate beam.

2. The method of claim 1, wherein determining the set of channel characteristics further comprises:
determining a frequency selectiveness of a channel for each candidate beam of the plurality of candidate beams, wherein the frequency selectiveness indicates the level of channel equalization by the UE.

3. The method of claim 1, wherein determining the set of channel characteristics further comprises:
determining a time selectiveness of a channel for each candidate beam of the plurality of candidate beams, wherein the time selectiveness indicates the level of channel equalization by the UE.

4. The method of claim 1, further comprising:
identifying an operating state of the UE, wherein selecting the candidate beam from the plurality of candidate beams is further based on the operating state of the UE.

5. The method of claim 4, wherein the operating state of the UE corresponds to a power state.

6. The method of claim 1, further comprising:
determining a weighting for the beam quality metric and a weighting for the set of the channel characteristics, wherein selecting the candidate beam from the plurality of candidate beams is further based on the weighting for the beam quality metric and the weighting for the set of the channel characteristics.

7. The method of claim 1, wherein the beam quality metric corresponds to a reference signal received power.

8. The method of claim 1, wherein the reference signal corresponds to a channel state information reference signal.

9. The method of claim 1, wherein the reference signal corresponds to a synchronization signal block.

10. An apparatus for wireless communication at a user equipment (UE), comprising:
a processor;
memory coupled with the processor; and
instructions stored in the memory and executable by the processor to cause the apparatus to:
measure a beam quality metric associated with a reference signal for each candidate beam of a plurality of candidate beams;
determine a set of channel characteristics for each candidate beam of the plurality of candidate beams, wherein the set of channel characteristics indicates to the UE a level of channel equalization by the UE associated with processing signaling on each candidate beam of the plurality of candidate beams;
select a candidate beam from the plurality of candidate beams based at least in part on the beam quality metric and the set of the channel characteristics; and
communicate with a base station using the selected candidate beam.

11. The apparatus of claim 10, wherein the instructions to determine the set of channel characteristics are further executable by the processor to cause the apparatus to:
determine a frequency selectiveness of a channel for each candidate beam of the plurality of candidate beams, wherein the frequency selectiveness indicates the level of channel equalization by the UE.

12. The apparatus of claim 10, wherein the instructions to determine the set of channel characteristics are further executable by the processor to cause the apparatus to:
determine a time selectiveness of a channel for each candidate beam of the plurality of candidate beams, wherein the time selectiveness indicates the level of channel equalization by the UE.

13. The apparatus of claim 10, wherein the instructions are further executable by the processor to cause the apparatus to:
identify an operating state of the UE, wherein selecting the candidate beam from the plurality of candidate beams is further based on the operating state of the UE.

14. The apparatus of claim 13, wherein the operating state of the UE corresponds to a power state.

15. The apparatus of claim 10, wherein the instructions are further executable by the processor to cause the apparatus to:
determine a weighting for the beam quality metric and a weighting for the set of the channel characteristics, wherein selecting the candidate beam from the plurality of candidate beams is further based on the weighting for the beam quality metric and the weighting for the set of the channel characteristics.

16. The apparatus of claim 10, wherein the beam quality metric corresponds to a reference signal received power.

17. The apparatus of claim 10, wherein the reference signal corresponds to a channel state information reference signal.

18. The apparatus of claim 10, wherein the reference signal corresponds to a synchronization signal block.

19. An apparatus for wireless communication at a user equipment (UE), comprising:
means for measuring a beam quality metric associated with a reference signal for each candidate beam of a plurality of candidate beams;
means for determining a set of channel characteristics for each candidate beam of the plurality of candidate beams, wherein the set of channel characteristics indicates to the UE a level of channel equalization by the UE associated with processing signaling on each candidate beam of the plurality of candidate beams;
means for selecting a candidate beam from the plurality of candidate beams based at least in part on the beam quality metric and the set of the channel characteristics; and
means for communicating with a base station using the selected candidate beam.

20. The apparatus of claim 19, wherein the means for determining the set of channel characteristics further comprise:
means for determining a frequency selectiveness of a channel for each candidate beam of the plurality of candidate beams, wherein the frequency selectiveness indicates the level of channel equalization by the UE.

21. The apparatus of claim 19, wherein the means for determining the set of channel characteristics further comprise:
means for determining a time selectiveness of a channel for each candidate beam of the plurality of candidate beams, wherein the time selectiveness indicates the level of channel equalization by the UE.

22. The apparatus of claim 19, further comprising:
means for identifying an operating state of the UE, wherein selecting the candidate beam from the plurality of candidate beams is further based on the operating state of the UE.

23. The apparatus of claim 22, wherein the operating state of the UE corresponds to a power state.

24. The apparatus of claim 19, further comprising:
means for determining a weighting for the beam quality metric and a weighting for the set of the channel characteristics, wherein selecting the candidate beam from the plurality of candidate beams is further based on the weighting for the beam quality metric and the weighting for the set of the channel characteristics.

25. The apparatus of claim 19, wherein the beam quality metric corresponds to a reference signal received power.

26. The apparatus of claim 19, wherein the reference signal corresponds to a channel state information reference signal.

27. The apparatus of claim 19, wherein the reference signal corresponds to a synchronization signal block.

28. A non-transitory computer-readable medium storing code for wireless communication at a user equipment (UE), the code comprising instructions executable by a processor to:
measure a beam quality metric associated with a reference signal for each candidate beam of a plurality of candidate beams;
determine a set of channel characteristics for each candidate beam of the plurality of candidate beams, wherein the set of channel characteristics indicates to the UE a level of channel equalization by the UE associated with processing signaling on each candidate beam of the plurality of candidate beams;
select a candidate beam from the plurality of candidate beams based at least in part on the beam quality metric and the set of the channel characteristics; and
communicate with a base station using the selected candidate beam.

29. The non-transitory computer-readable medium of claim 28, wherein the instructions to determine the set of channel characteristics are further executable by the processor to:
determine a frequency selectiveness of a channel for each candidate beam of the plurality of candidate beams, wherein the frequency selectiveness indicates the level of channel equalization by the UE.

30. The non-transitory computer-readable medium of claim 28, wherein the instructions to determine the set of channel characteristics are further executable by the processor to:
determine a time selectiveness of a channel for each candidate beam of the plurality of candidate beams, wherein the time selectiveness indicates the level of channel equalization by the UE.

* * * * *